United States Patent [19]
Öser

[11] Patent Number: 5,525,308
[45] Date of Patent: Jun. 11, 1996

[54] EXHAUST GAS PURIFICATING ARRANGEMENT FOR AN INTERNAL COMBUSTION ENGINE HAVING A GAS ADSORBER AND A CATALYZER DOWNSTREAM FROM THE GAS ADSORBER

[75] Inventor: Polat Öser, Wolfsburg, Germany

[73] Assignee: Volkswagen AG, Wolfsburg, Germany

[21] Appl. No.: 387,026

[22] Filed: Feb. 10, 1995

[30] Foreign Application Priority Data

Feb. 11, 1994 [DE] Germany .......................... 44 04 377.5

[51] Int. Cl.⁶ ..................................... F01N 3/10
[52] U.S. Cl. ......................... 422/171; 422/169; 422/170; 422/173; 422/179; 165/32; 60/297
[58] Field of Search .................................. 422/169, 170, 422/171, 173, 174, 179, 180, 221, 222; 165/32 HV; 431/5, 7, 170; 60/297, 299

[56] References Cited

U.S. PATENT DOCUMENTS

| | | | |
|---|---|---|---|
| 3,775,064 | 11/1973 | Berger et al. | 60/300 |
| 4,985,210 | 1/1991 | Minami | 422/169 |
| 5,051,244 | 9/1991 | Dunne et al. | 423/212 R |
| 5,131,456 | 7/1992 | Wu | 165/32 HV |
| 5,170,624 | 12/1992 | Cornelison et al. | 422/174 |
| 5,271,906 | 12/1993 | Yuuki et al. | 422/177 |

FOREIGN PATENT DOCUMENTS

| | | |
|---|---|---|
| 0532803 | 3/1993 | European Pat. Off. . |
| 1299005 | 3/1970 | Germany . |
| 4033827 | 5/1991 | Germany . |
| 4208624 | 9/1993 | Germany . |

OTHER PUBLICATIONS

"Catalytic Converter on the Road to High Tech," *VDI News*, No. 38, Sep. 24, 1993, pp. 11 and 12.
"Potential For Emissions Reduction is in the Detail," *VDI News*, No. 5, Feb. 5, 1993, p. 25.

Primary Examiner—Robert J. Warden
Assistant Examiner—Hien Tran
Attorney, Agent, or Firm—Brumbaugh, Graves, Donohue & Raymond

[57] ABSTRACT

An exhaust gas purifier arrangement for an internal combustion engine includes a gas adsorber and a catalyzer located downstream from the adsorber in the direction of exhaust gas flow and a burner providing hot burner gases to heat the catalyzer through a burner pipe which traverses the adsorber, and also includes an arrangement for controlling the heat transfer between the burner pipe and the gas adsorber so that heating the adsorber to its desorption temperature is accelerated at low ambient temperatures.

5 Claims, 2 Drawing Sheets

EXHAUST GAS PURIFICATING ARRANGEMENT FOR AN INTERNAL COMBUSTION ENGINE HAVING A GAS ADSORBER AND A CATALYZER DOWNSTREAM FROM THE GAS ADSORBER

BACKGROUND OF THE INVENTION

This invention relates to exhaust gas purification arrangements containing both a catalyzer and a gas adsorber.

German Offenlegungsschrift No. 40 33 827 and European Patent Application No. 0 532 803 describe exhaust gas purification arrangements having both a catalyst and a gas adsorber which are especially suited for motor vehicle internal combustion engines. These documents also disclose information relating to the choice of a gas adsorber, which is generally a zeolite. However, the term "adsorber" as used herein, means any arrangement having a gas adsorbent action and, at higher temperatures, a desorbent action.

Providing an adsorber for the temporary retention of hydrocarbons contained in exhaust gases takes into account the fact that a catalyzer initiates its exhaust gas-purifying action only after it has reached its start-up temperature, which, depending on the age of the catalyzer material, is in the range of 250°C. to 350°C. Consequently, following cold-start of an internal combustion engine, the exhaust gases leave the exhaust system in an unpurified state, resulting in environmental problems, unless corrective action is taken.

It is known, for example, from German Offenlegungsschrift Nos. 1 299 005 and 42 08 624 and from *German Engineering Association News* (*VDI-Nachrichten*), No.38 of Sep. 24, 1993, page 11, to heat a catalyzer, either electrically or with the aid of a combustion chamber, so that it reaches its operating temperature more rapidly. As a rule, however, such arrangements do not permanently provide more rapid heating to a desired temperature within an acceptable time period.

In conventional arrangements for preheating catalysts within the required time period by heating the catalyzer to its operating temperature with hot exhaust gases, it has been assumed that the catalyzer will have reached its operating temperature, at least in significant regions, before a gas adsorber preceding the catalyst has been heated by the hot exhaust gases to its gas desorption temperature. At the gas desorption temperature, the adsorber releases the stored exhaust gases for catalytic treatment in the catalyzer. The gas-release requirement, however, which must be met under all age conditions of the catalyzer, is further complicated by another problem, particularly important in the case of motor vehicle internal combustion engines which, as is known, must be operated over a very wide range of ambient temperatures, down to −20°C. or less. This problem is that, in the case of very low ambient temperatures and short trips by the motor vehicle, the adsorber may not release the stored exhaust gases during such short operating times because it does not reach its desorption temperature. Consequently, the adsorber will not be capable of adsorbing and retaining newly-generated quantities of exhaust gas components.

SUMMARY OF THE INVENTION

Accordingly, it is an object of the present invention to provide an exhaust gas purification arrangement which not only ensures rapid heating of the catalyzer to its operating temperature while obviating the need for the high electrical-energy consumption required for electrical catalyzer heaters, but also avoids overloading of the adsorber during short-term operation at low ambient temperatures.

These and other objects of the invention are attained by providing an exhaust gas purifier having a burner arrangement for accelerating the heating of the catalyzer at low operating temperatures while avoiding direct heat exchange between the hot burner gases and the adsorber, at least when the catalyzer has not yet reached an operating temperature.

A significant advantage of the invention is that the invention requires only one heating arrangement, which is of a conventional type, not only for rapid heating of the catalyzer, but also for heating the adsorber under low ambient temperature conditions. The heating arrangement is a conventional burner supplied with a fuel/air mixture and an ignition device.

Thus, the invention not only provides a burner which is conventionally used for heating a catalyzer in an arrangement in which the burner pipe traverses the gas adsorber, it also assures that, in fact, the catalyzer is heated to its start-up temperature by the hot burner gases as quickly as possible under all external temperature conditions. The invention also assures that heat transfer from the burner gases to the gas adsorber is inhibited during the start-up time period so that the catalyzer reaches its operating temperature before the adsorber has been heated to its desorption temperature.

In a representative embodiment, this is accomplished by providing an intermediate layer between the burner pipe and the adsorber which diminishes or delays the transfer of heat from the burner pipe to the adsorber. A particularly effective embodiment includes a temperature-responsive bypass around the adsorber so that the hot burner gases are actually applied to the adsorber only under very low ambient temperature conditions.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
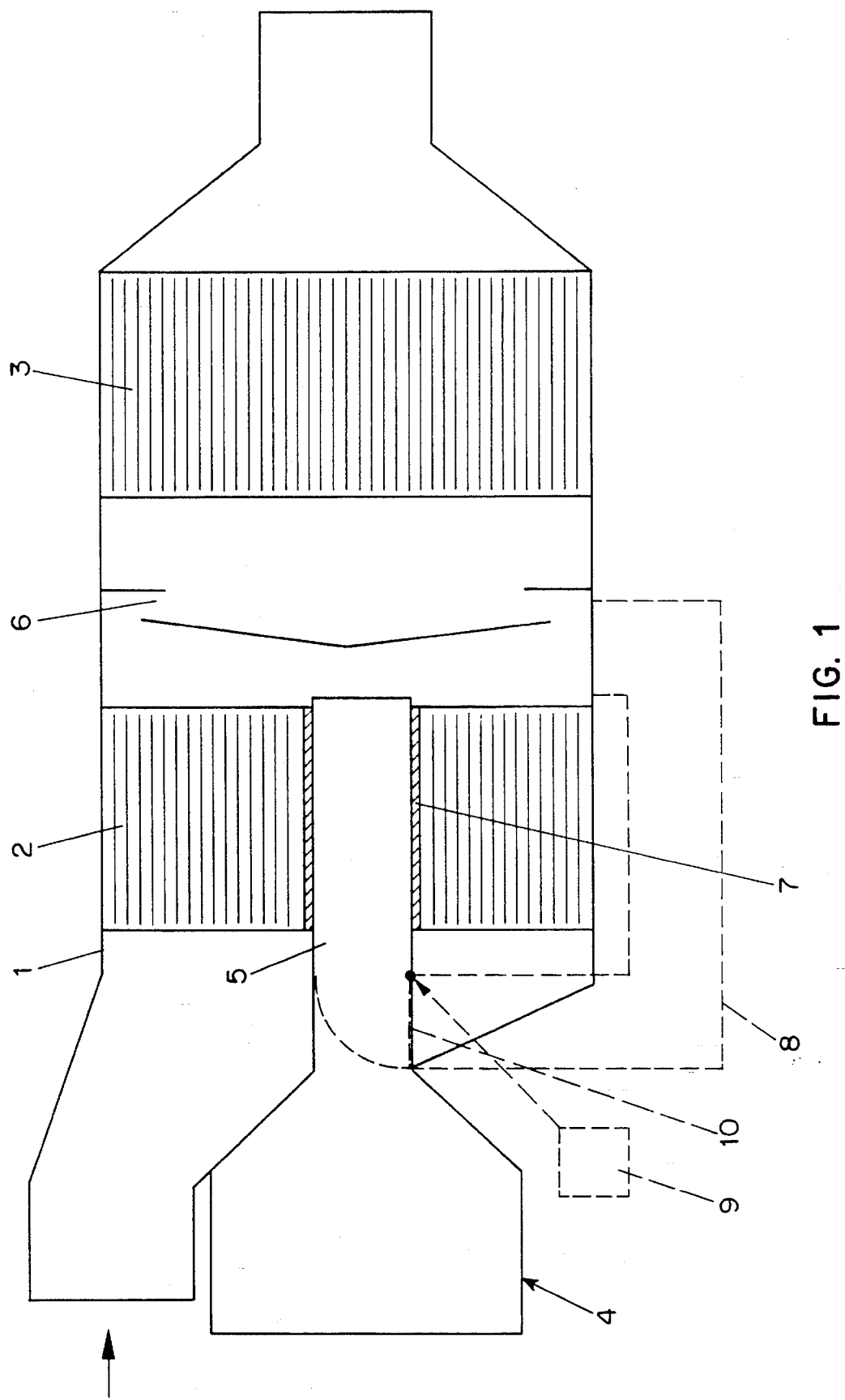
FIG. 1 is a view in longitudinal section schematically illustrating a representative exhaust gas purifier arranged in accordance with the invention.

In the typical embodiment of the invention shown in FIG. 1, an exhaust gas purifier includes a gas adsorber 2 and a catalyzer 3 mounted in a common housing 1 with the catalyzer 3 downstream from the gas adsorber 2 in the direction of exhaust gas flow, as indicated by the arrow in the drawing. Both the catalyzer 3 and the gas adsorber 2 have a conventional structure which is known to those skilled in the art and therefore will not be explained in detail. Moreover, the invention is not limited to any specific design of catalyzer or gas adsorber.

A burner 4, which is schematically shown in the drawing, is equipped with supply lines for fuel and combustion air and with an ignition device (not shown) and is located ahead of the gas adsorber 2 in the purification arrangement. During cold start-up, the burner 4 is ignited to supply hot burner gases to the front surface of the catalyzer 3 through a burner pipe 5 extending through the gas adsorber 2. The operation of the burner is discontinued by means of a temperature sensor (not shown) no later than the time when the catalyzer 3 has reached its operating temperature. In the illustrated embodiment, a turbulence-generating arrangement 6 is disposed in the space between the gas adsorber 2 and the catalyzer 3.

The burner pipe 5 passes through the central part of the gas adsorber 2. Between the pipe 5 and the adsorber 2, there is an intermediate layer 7 made of a material which diminishes heat transfer from the burner pipe 5 to the adsorber 2 and is arranged so that, at very low ambient temperatures, the adsorber is at least partially unloaded (by release of some of the adsorbed gases) even during short trips while at the same time assuring that the catalyzer, having been subjected to the hot burner gases, will have essentially reached its operating temperature at the time that the adsorber has been heated to its desorption temperature.

If desired, the transfer of heat from the burner pipe 5 to the adsorber 2 through the intermediate layer 7 throughout the entire range of ambient temperatures can be avoided by passing the hot burner gases through the gas adsorber 2 only at very low ambient temperatures. For this purpose, a bypass 8 is provided which extends from the burner pipe 5 around the gas adsorber 2 outside the housing 1 and reenters the housing upstream from the catalyzer 3.

In this arrangement, an actuating device 9 containing an ambient-temperature sensor controls a flap 10 at the entrance to the bypass 8 so that the adsorber 2 is heated by the hot burner gases flowing through the burner pipe 5 only at low ambient temperatures. At all other ambient temperatures, the flap 10 opens the bypass 8 to circumvent the adsorber 2. With this arrangement, thermal shielding is provided for the adsorber, reducing its aging characteristics.

Figure 2:
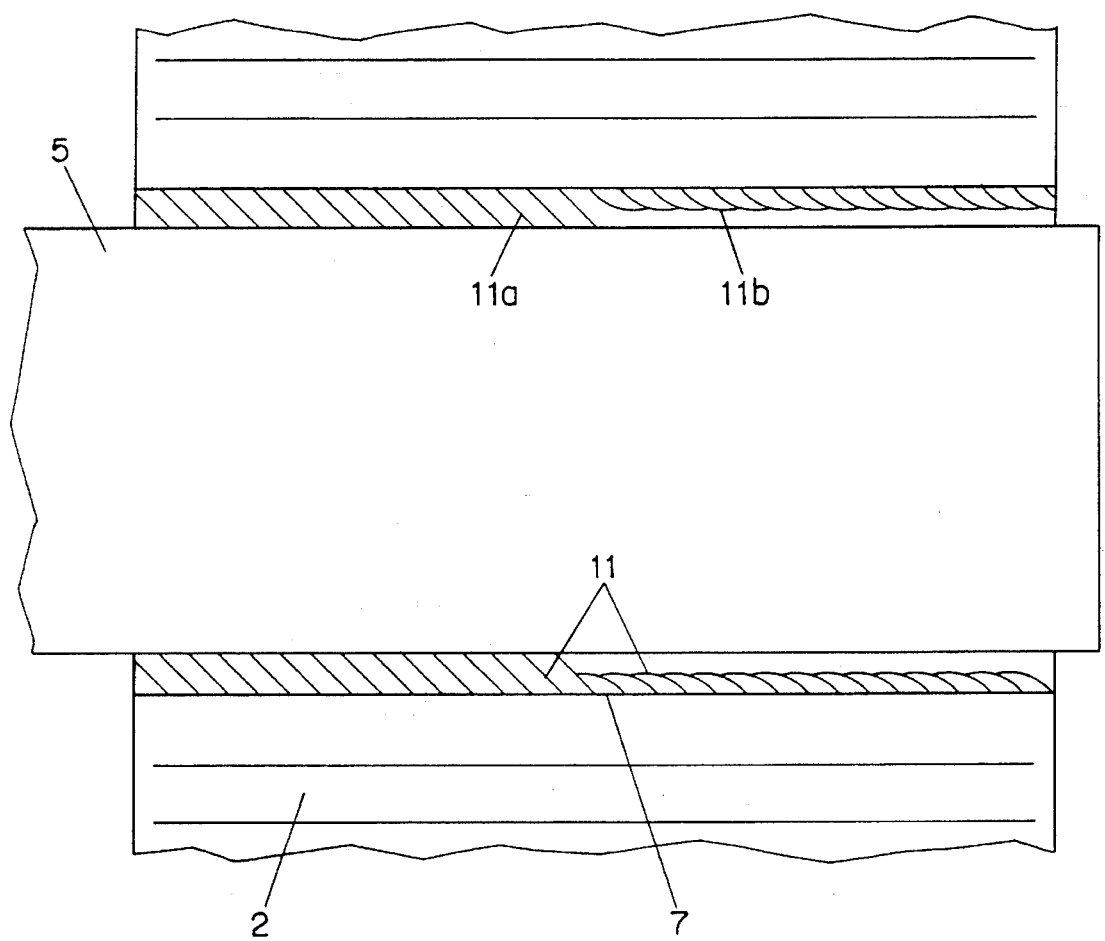
FIG. 2 is a fragmentary view showing an alternative intermediate layer arrangement.

If desired, the intermediate layer 7 may be made with thermally-responsive elements 11, for example, of the bi-metal type, which are mounted between opposite walls of the layer 7 and change their shape as a function of the temperature in a manner such that they provide heat-conducting bridges between the adsorber 2 and the burner pipe 5 only when the adsorber is at low ambient temperatures. This intermediate layer arrangement is shown in FIG. 2.

When the thermally-responsive elements 11, such as bimetallic elements, are at a low temperature (e.g., below 0°), they are in a position 11a to provide heat bridges between the burner pipe 5 and the adsorber 2. At a higher temperature, the thermally-responsive elements 11 bend toward the adsorber 2 to a position 11b providing more heat insulation in the intermediate layer 7. Generally, to obtain the best temperature effects, the thermally-responsive elements 11 are mounted adjacent to the gas adsorber 2 and not on the side of the layer 7 toward the burner pipe 5 so that they are more responsive to the temperature of the adsorber 2 than to the temperature of the burner pipe 5. This results in a slower response to the burner heat in the pipe 5.

Thus, the invention provides an exhaust gas purification arrangement which, by making dual use of a conventional burner, assures both rapid heating of the catalyzer to its operating temperature and a reduction in the time required for heating the adsorber to its desorption temperature as a function of the ambient temperature.

Although the invention has been described herein with reference to specific embodiments, many modifications and variations therein will readily occur to those skilled in the art. Accordingly, all such variations and modifications are included within the intended scope of the invention.

I claim:

1. An exhaust gas purifier arrangement for an internal combustion engine comprising a housing having an inlet to receive exhaust gases from the internal combustion engine and an outlet for releasing the exhaust gases a gas adsorber within the housing for storage of hydrocarbons from the exhaust gases flowing through the housing at temperatures below a gas desorption temperature of the adsorber, a catalyzer in the housing located downstream from the adsorber in the direction of exhaust gas flow through the housing for removing undesired components from exhaust gases flowing through the housing at least after the catalyzer has reached an operating temperature, a burner supplying heated burner gases for accelerating heating of the catalyzer to the catalyzer operating temperature, a burner pipe arranged to supply the heated burner gases to the catalyzer for accelerating the heating of the catalyzer to the catalyzer operating temperature at cold start of the engine while avoiding direct heat exchange between the gas adsorber and the hot burner gases until the catalyzer has reached the catalyzer operating temperature, and means to supply heat from the heated burner gases to the gas adsorber to accelerate heating of the gas adsorber to the adsorber desorption temperature when the catalyzer has reached the catalyzer operating temperature.

2. An exhaust gas purifier arrangement according to claim 1 wherein the burner pipe traverses the gas adsorber and the means to supply heat from the heated burner gases to the gas adsorber includes a heat transfer connection between the burner pipe and the gas adsorber.

3. An exhaust gas purifier arrangement according to claim 3 wherein the heat transfer connection is an intermediate layer surrounding the burner pipe which limits transfer of heat from the burner pipe to the gas adsorber.

4. An exhaust gas purifier arrangement according to claim 3 wherein the means to supply heat from the heated gases to the gas adsorber further comprises a temperature-responsive element in the intermediate layer, the temperature-responsive element being arranged to change shape to form a heat-transfer bridge between the burner pipe and the gas adsorber only at low ambient temperatures.

5. An exhaust gas purifier arrangement according to claim 2 including a valve means between the burner and the burner pipe for diverting heated burner gases from the burner pipe into a bypass around the gas adsorber the bypass being closed only at low ambient temperatures.

* * * * *

UNITED STATES PATENT AND TRADEMARK OFFICE
CERTIFICATE OF CORRECTION

PATENT NO. : 5,525,308

DATED : June 11, 1996

INVENTOR(S) : Polat Öser

It is certified that error appears in the above-indentified patent and that said Letters Patent is hereby corrected as shown below:

Title page, Item 54, and Column 1, line 1, "PURIFICATING" should read --PURIFICATION--;

Column 4, bridging lines 41-42, "claim 3" should read --claim 2--.

Signed and Sealed this

Twenty-second Day of October, 1996

Attest:

BRUCE LEHMAN

Attesting Officer

Commissioner of Patents and Trademarks